United States Patent
Lewis et al.

(10) Patent No.: US 7,105,796 B2
(45) Date of Patent: Sep. 12, 2006

(54) PROTECTIVE SHROUD FOR THERMAL IMAGING CAMERA MOUNTED TO PROTECTIVE HELMET

(75) Inventors: Patricia K. Lewis, Tipp City, OH (US); William L. Grilliot, Dayton, OH (US); Mary I. Grilliot, Dayton, OH (US)

(73) Assignee: Morning Pride Manufacturing, L.L.C., Dayton, OH (US)

( * ) Notice: Subject to any disclaimer, the term of this patent is extended or adjusted under 35 U.S.C. 154(b) by 124 days.

(21) Appl. No.: 10/976,577

(22) Filed: Oct. 29, 2004

(65) Prior Publication Data

US 2005/0127273 A1    Jun. 16, 2005

Related U.S. Application Data

(63) Continuation-in-part of application No. 10/732,158, filed on Dec. 10, 2003.

(51) Int. Cl.
*H01L 27/00* (2006.01)
(52) U.S. Cl. .................... 250/208.1; 250/330
(58) Field of Classification Search ............... 250/330, 250/333, 342, 353, 338.3, 208.1; 359/350, 359/356; D29/103
See application file for complete search history.

(56) References Cited

U.S. PATENT DOCUMENTS

| | | | |
|---|---|---|---|
| 5,089,914 A | 2/1992 | Prescott | |
| 6,016,160 A | 1/2000 | Coombs et al. | |
| 6,023,288 A | 2/2000 | Coombs et al. | |
| 6,369,952 B1 * | 4/2002 | Rallison et al. | 359/630 |
| 6,476,391 B1 | 11/2002 | Zhang | |
| 6,606,114 B1 | 8/2003 | Gordon et al. | |
| 6,912,727 B1 * | 7/2005 | Buchanan, Jr. | 2/6.2 |
| 2003/0122958 A1 | 7/2003 | Olita et al. | |

* cited by examiner

*Primary Examiner*—David Porta
*Assistant Examiner*—Faye Boosalis
(74) *Attorney, Agent, or Firm*—Wood, Phillips, Katz, Clark & Mortimer

(57) ABSTRACT

A thermal imaging camera, which is mounted to a protective helmet, is used with a display, which has a viewing lens, and with an arm, which connects the thermal imaging camera to the display. A protective shroud covers the display, except for the viewing lens, and covers the arm. The protective shroud, which is aluminized so as to be heat-reflective and which is thermally insulative, is attached to or is unitary with another protective shroud, which covers surfaces of the thermal imaging camera.

18 Claims, 1 Drawing Sheet

PROTECTIVE SHROUD FOR THERMAL IMAGING CAMERA MOUNTED TO PROTECTIVE HELMET

CROSS-REFERENCE TO A RELATED APPLICATION

This application is a continuation-in-part of U.S. patent application Ser. No. 10/732,158, which was filed on Dec. 10, 2003, and the disclosure of which is incorporated herein by reference.

BACKGROUND OF THE INVENTION

As exemplified in U.S. Pat. No. 5,089,914, No. 6,016,160, No. 6,023,288, No. 6,476,391, and No. 6,606,114 B1, and in U.S. Patent Application Publication No. U.S. 2003/0122958 A1, it is known to mount a thermal imaging camera and an associated display (viewer) to a firefighter's helmet, so as to provide the firefighter with thermal images of fallen or trapped persons or of heat-radiating objects, who or which would be otherwise obscured, as by smoke.

As exemplified in U.S. Pat. No. 6,016,160, No. 6,023,288, and No. 6,606,114 B1, it is known to mount a thermal imaging camera and an associated display below a front area of a brim of a firefighter's helmet and to place the thermal imaging camera to one side of the firefighter's head, so as to protect the thermal imaging camera against falling objects and so as to place the thermal imaging camera in what is described as "an envelope of reduced heat" below the front area of the brim.

As exemplified in U.S. Patent Application Publication No. U.S. 2003/0122958 A1, the disclosure of which is incorporated by reference herein, it is known to mount a thermal imaging camera above a front area of a brim of a firefighter's helmet and to mount an associated display below the front brim. Therefore, advantageously, the thermal imaging camera provides the firefighter with a thermal image that is centered correctly, as compared to the thermal image provided to the firefighter by a thermal imaging camera placed to one side of the firefighter's head. However, disadvantageously, the thermal imaging camera is not protected by the front area of the brim of the firefighter's helmet, against direct impingement of thermal radiation, which may cause the thermal imaging camera to overheat.

In U.S. patent application Ser. No. 10/732,158, supra, an aluminized, thermally insulative, protective shroud is disclosed, which is adapted, when secured to a protective helmet, to cover top, side, front, and bottom surfaces of the thermal imaging camera, except for a front opening for a front lens and except for a bottom opening for an associated arm connecting the thermal imaging camera to the associated display.

In the relevant art, the associated arm and the associated display may be also called an optical boom for the thermal imaging camera. In the relevant art, the abbreviation TIC may be also used to refer to a thermal imaging camera.

SUMMARY OF THE INVENTION

This invention provides in a combination comprising a thermal imaging camera, which is mountable to a protective helmet, a display, which has a viewing lens, and an arm, which connects the thermal imaging camera to the display, an improvement wherein the combination comprises a protective shroud, which is adapted to cover the display, except for the viewing lens, and which is adapted to cover the arm. The protective shroud may be heat-reflective, thermally insulative, or both, which is preferred. The protective shroud may be aluminized so as to be heat-reflective.

In advantageous embodiments of this invention, the protective shroud is adapted to abut, to be attached to, or to be unitary with another protective shroud, which is adapted to cover surfaces of the thermal imaging camera, such as the protective shroud disclosed in U.S. patent application Ser. No. 10/732,158, supra.

BRIEF DESCRIPTION OF THE DRAWINGS

In FIG. 2, the thermal imaging camera is illustrated as mounted to a protective helmet, which is illustrated in broken lines.

In FIG. 4, the thermal imaging camera is illustrated as mounted to a protective helmet, which is illustrated in broken lines.

DETAILED DESCRIPTION OF THE ILLUSTRATED EMBODIMENTS

Figure 1:
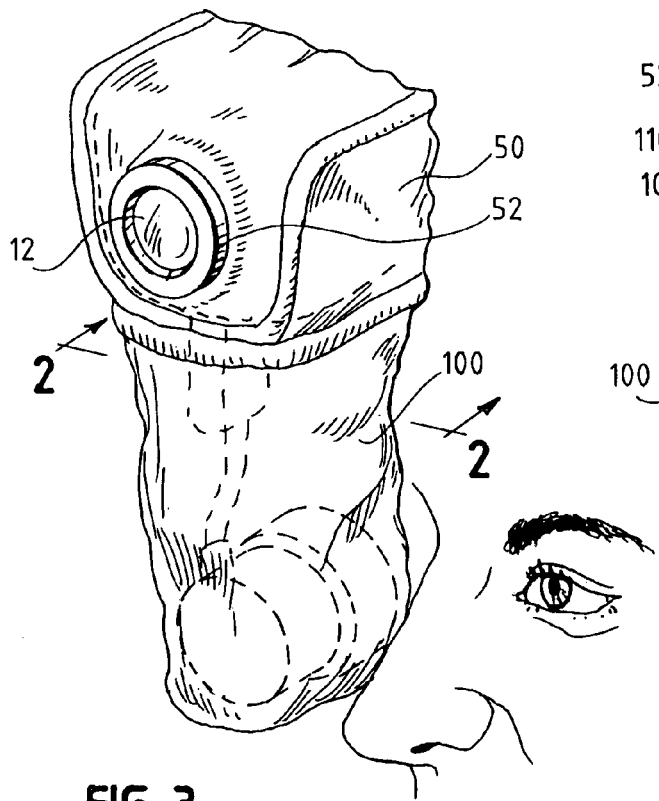
FIG. 1 is a perspective view of one contemplated embodiment, wherein a protective shroud embodying this invention covers a display, except for a viewing lens, wherein the protective shroud covers an arm connecting a thermal imaging camera to the display, and wherein the protective shroud abuts and is attached to another protective shroud covering surfaces of the thermal imaging camera.
Figure 2:
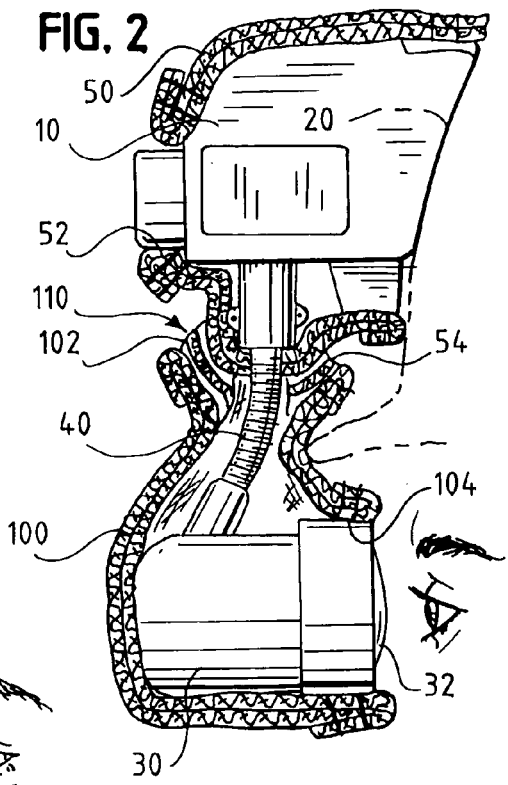
FIG. 2 is a sectional view, as taken along line 2—2 in FIG. 1, in a direction indicated by arrows.

As illustrated in FIGS. 1 and 2, in a combination comprising a thermal imaging camera 10, which is mounted to a protective helmet 20, a display 30, which has a viewing lens 32, an arm 40, which connects the thermal imaging camera 10 to the display 30, and a protective shroud 50, which covers surfaces of the thermal imaging camera 10, such as the protective shroud disclosed in U.S. patent application Ser. No. 10/732,158, supra, a protective shroud 100 provided by this invention covers the display 30, except for the viewing lens 32, and covers the connecting arm 40. The protective shroud 100 has a top opening 102, which fits loosely around the connecting arm 40, and a back opening 104, which may be elasticized for a snug fit around the display 30 and through which the viewing lens 32 is exposed.

As disclosed in U.S. patent application Ser. No. 10/732,158, supra, the protective shroud 50 has a front opening 52 for a front lens 12 of the thermal imaging camera 10 and a bottom opening 54 for the connecting arm 40. As illustrated in FIG. 2, the protective shroud 100 abuts and is attached to the protective shroud 50, so that the top opening 102 of the protective shroud 100 communicates with the bottom opening 54 of the protective shroud 50. As illustrated in FIG. 2, the protective shroud 100 is attached detachably to the protective shroud 50, via hook-and-loop fastening means 110. Alternatively, the protective shroud 100 is attached non-detachably to the protective shroud 50, possibly via stitching or adhesively.

As disclosed in U.S. patent application Ser. No. 10/732,158, supra, the protective shroud 50 has plural fabric layers including one or more inner, possibly quilted, thermally insulative layers and an outer layer, which is aluminized so as to be heat-reflective. Similarly, the protective shroud 100 has plural fabric layers including one or more inner, possibly quilted, thermally insulative layers and an outer layer, which is aluminized so as to be heat-reflective.

Figure 3:
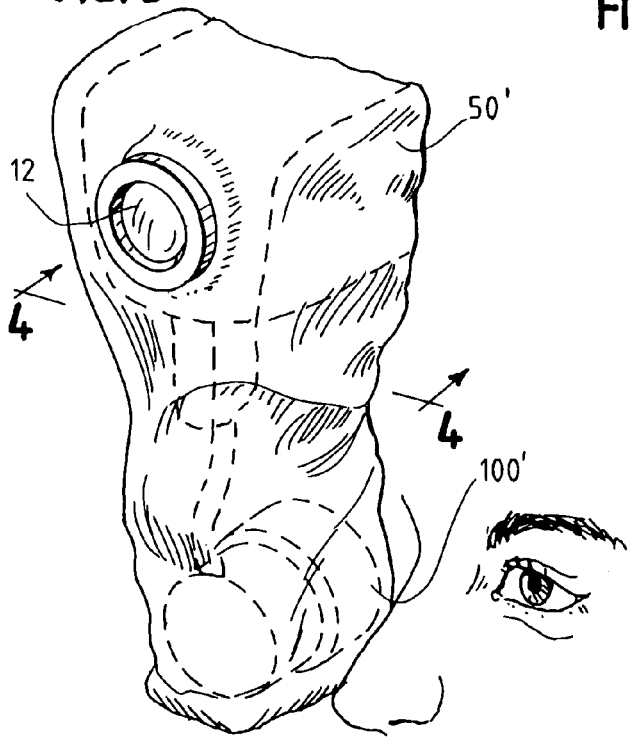
FIG. 3 is a perspective view of an alternative embodiment, wherein the protective shroud covers the display, except for the viewing lens, wherein the protective shroud covers the connecting arm, and wherein the protective shroud is unitary with the protective shroud covering surfaces of the thermal imaging camera.
Figure 4:
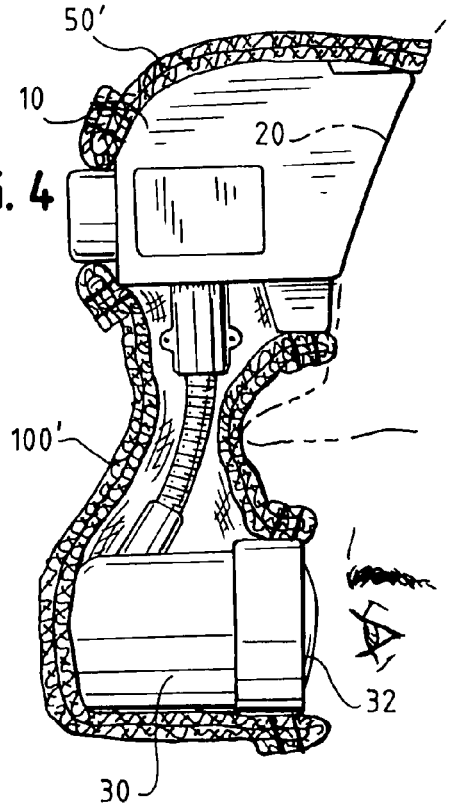
FIG. 4 is a sectional view, as taken along line 4—4 in FIG. 3, in a direction indicated by arrows.

As illustrated in FIGS. 3 and 4, a combination comprising the thermal imaging camera 10, which is mounted to the protective helmet 20, the display 30, which has the viewing lens 32, the arm 40, which connects the thermal imaging camera 10 to the display 30, a protective shroud 50', which covers surfaces of the thermal imaging camera 10, and a protective shroud 100', which covers the display 30, except for the viewing lens 32, and which covers the connecting arm 40, is similar to the combination illustrated in FIGS. 1 and 2 and described above, except that the protective shroud 100' is unitary with the protective shroud 50'. Where the protective shroud 100' approaches the protective shroud 50', the protective shroud 100' fits loosely around the connecting arm 40, so that the unitary shrouds 50', 100', can be pulled over the display 30 and, thereupon, over the thermal imaging camera 10, when the unitary shrouds 50', 100', are installed.

Advantageously, whether in the combination illustrated in FIGS. 1 and 2 and described above or in the combination illustrated in FIGS. 3 and 4 and described above, the protective shroud provided by this invention protects the display 30 and the connecting arm 40 against being overheated by direct impingement of thermal radiation.

The invention claimed is:

1. In a combination comprising a thermal imaging camera, which is mountable to a protective helmet, a display, which has a viewing lens, and an arm, which connects the thermal imaging camera to the display, an improvement wherein the combination comprises a protective shroud, which is adapted to cover the display, except for the viewing lens, and which is adapted to cover the arm.

2. The improvement of claim 1, wherein the protective shroud is heat-reflective.

3. The improvement of claim 2, wherein the protective shroud is aluminized so as to be heat-reflective.

4. The improvement of claim 3, wherein the protective shroud is thermally insulative.

5. The improvement of any one of claims 1 through 4, wherein the protective shroud is adapted to abut another protective shroud, which is adapted to cover top, side, and front surfaces of the thermal imaging camera.

6. The improvement of any one of claims 1 through 4, wherein the protective shroud is attached to another protective shroud, which is adapted to cover top, side, and front surfaces of the thermal imaging camera.

7. The improvement of any one of claims 1 through 4, wherein the protective shroud is unitary with another protective shroud, which is adapted to cover top, side, and front surfaces of the thermal imaging camera.

8. The improvement of claim 1, wherein the protective shroud is thermally insulative.

9. The improvement of claim 2, wherein the protective shroud is thermally insulative.

10. A combination comprising a thermal imaging camera, which is mounted to a protective helmet, a display, which has a viewing lens, an arm, which connects the thermal imaging camera to the display, and a protective shroud, which covers the display, except for the viewing lens, and which covers the arm.

11. The improvement of claim 10, wherein the protective shroud is heat-reflective.

12. The improvement of claim 11, wherein the protective shroud is aluminized so as to be heat-reflective.

13. The improvement of claim 12, wherein the protective shroud is thermally insulative.

14. The improvement of any one of claims 10 through 13, wherein the protective shroud abuts another protective shroud, which covers surfaces of the thermal imaging camera.

15. The improvement of any one of claims 10 through 13, wherein the protective shroud is attached to another protective shroud, which covers surfaces of the thermal imaging camera.

16. The improvement of any one of claims 10 through 13, wherein the protective shroud is unitary with another protective shroud, which covers surfaces of the thermal imaging camera.

17. The improvement of claim 11, wherein the protective shroud is thermally insulative.

18. The improvement of claim 10, wherein the protective shroud is thermally insulative.

* * * * *